(12) United States Patent
Botargues et al.

(10) Patent No.: US 9,045,236 B2
(45) Date of Patent: Jun. 2, 2015

(54) DEVICE FOR EXCITING A LANDING GEAR OF AN AIRCRAFT WHILE ON THE GROUND

(71) Applicant: Airbus Operations (SAS), Toulouse (FR)

(72) Inventors: Nicolas Botargues, Toulouse (FR); Bruno LaGarde, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 286 days.

(21) Appl. No.: 13/774,099

(22) Filed: Feb. 22, 2013

(65) Prior Publication Data

US 2013/0340528 A1 Dec. 26, 2013

(30) Foreign Application Priority Data

Feb. 24, 2012 (FR) ...................................... 12 51730

(51) Int. Cl.
*G01H 1/00* (2006.01)
*B64F 5/00* (2006.01)
*G01M 7/06* (2006.01)

(52) U.S. Cl.
CPC ............... *B64F 5/0045* (2013.01); *G01M 7/06* (2013.01)

(58) Field of Classification Search
CPC ...... A63H 27/12; B64C 1/0009; B64C 25/10; B64C 27/20; B64C 30/00
USPC ........ 73/11.07, 11.08, 11.09, 118.01, 118.03, 73/170.02, 802, 583
See application file for complete search history.

(56) References Cited

U.S. PATENT DOCUMENTS

| 3,133,717 | A | * | 5/1964 | Hartel | 244/103 R |
|---|---|---|---|---|---|
| 3,687,400 | A | * | 8/1972 | Fitzgerald et al. | 244/102 R |
| 3,739,519 | A | * | 6/1973 | Garabello | 446/55 |
| 4,172,570 | A | * | 10/1979 | Leoni | 244/17.17 |
| 4,556,179 | A | * | 12/1985 | Veaux et al. | 244/102 R |
| 4,869,444 | A | * | 9/1989 | Ralph | 244/104 FP |
| 4,889,202 | A | * | 12/1989 | Bron | 177/134 |
| 6,202,960 | B1 | * | 3/2001 | Travis et al. | 244/103 R |
| 6,638,071 | B2 | * | 10/2003 | Stockman | 434/35 |
| 7,677,096 | B2 | * | 3/2010 | Robinson et al. | 73/170.02 |
| 7,690,264 | B2 | * | 4/2010 | Robinson et al. | 73/812 |
| 7,942,046 | B2 | * | 5/2011 | Jones | 73/118.03 |
| 2005/0178900 | A1 | * | 8/2005 | Quayle | 244/102 R |
| 2006/0144993 | A1 | * | 7/2006 | Hsu et al. | 244/50 |
| 2007/0257150 | A1 | * | 11/2007 | Robinson et al. | 244/103 R |
| 2009/0056431 | A1 | * | 3/2009 | Jones | 73/118.03 |
| 2012/0043418 | A1 | * | 2/2012 | Isotani et al. | 244/102 R |
| 2014/0084109 | A1 | * | 3/2014 | Prud'Homme-Lacroix | 244/108 |
| 2014/0263833 | A1 | * | 9/2014 | Brighton et al. | 244/102 R |

FOREIGN PATENT DOCUMENTS

EP 1852349 11/2007
WO 2007104995 9/2007

OTHER PUBLICATIONS

French Search Report, Nov. 29, 2012.

* cited by examiner

*Primary Examiner* — Laura Martin
*Assistant Examiner* — Samir M Shah
(74) *Attorney, Agent, or Firm* — Greer, Burns & Crain Ltd.

(57) ABSTRACT

A device for exciting a landing gear of an aircraft while it is on the ground. The device includes an oblong bracing foot, a movable support on which the oblong foot is mounted and an arrangement for setting the gear into vibration.

11 Claims, 7 Drawing Sheets

DEVICE FOR EXCITING A LANDING GEAR OF AN AIRCRAFT WHILE ON THE GROUND

CROSS-REFERENCES TO RELATED APPLICATIONS

This application claims the benefit of the French patent application No. 12 51730 filed on Feb. 24, 2012, the entire disclosures of which are incorporated herein by way of reference.

FIELD OF THE INVENTION

The present invention relates to a device for the excitation, on the ground, of a landing gear of an aircraft and, especially, of the front landing gear.

BACKGROUND OF THE INVENTION

It is known that, on account of the rolling of the wheels on the runway, the lower part of the front gear of an aircraft is subjected to vibrations which are induced by the unbalance of the wheels, the unevenness of the runway or else through the landing gear entering torsional resonance, which is weakly damped.

Such vibrations have a frequency which is related to the rolling speed of the aircraft. Their amplitude depends on the dynamic characteristics of the front gear and the transmissibility of said vibrations to the remainder of the structure of the gear.

Even in the case where such vibrations are not significant enough to cause an accident, they are troublesome and dangerous and can cause interruptions to takeoff and/or damage, especially to the hardware of the electronic bays of the front part of the aircraft.

These vibrations, which occur even in a brand new aircraft through the resonance between the landing gear and the structure of the aircraft, cannot actually be assessed as long as the latter has not performed its first flight and the design of the front gear and of the structure of the aircraft has not been finalized.

Hence, to forestall the occurrence of such vibrations and/or to limit the effects thereof, it is indispensable to study them prior to the commissioning of each aircraft, so as to be able to parameterize the various devices of the latter accordingly.

Thus, in a known manner, to excite the front gear of an aircraft and study the resulting vibrations, the aircraft is raised up completely above the ground, by means of hydraulic rams. When the aircraft is raised, a static loading is applied to the wheels of the front gear with the aid of elastic cords, attached to the aircraft's towing hook, so as to limit the play between the various components of the front gear. The front gear is thereafter set into vibration by way of vibrating shakers disposed in contact with its wheels. The vibrations are recorded by means of sensors mounted on the structure of the aircraft.

However, in addition to the fact that the realization of such an excitation is lengthy and irksome to implement, the dynamic behavior of the front gear thus obtained remains very approximate and far from reality: the front gear, which does not rest on the ground, is completely unstressed, so that the subsequent adjusting of the various parameters of the aircraft is inaccurate.

SUMMARY OF THE INVENTION

The object of the present invention is to remedy these drawbacks.

To this end, according to the invention, the device for the excitation on the ground of a landing gear of an aircraft (for example a front gear), said gear comprising a strut disposed vertically during said excitation, an axle disposed orthogonally with respect to said strut and at least one wheel mounted freely rotatable about said axle, is noteworthy in that it comprises:

an oblong bracing foot, of vertical axis, able to hold said wheel raised with respect to the ground and comprising a lower part and an upper part connected together by a revolving linkage permitting free rotation, about the axis of said bracing foot, of the upper part of said foot with respect to the lower part, said upper part being able to be applied to the lower end of said strut;

support means on which said oblong foot is mounted, said support means being movable in a horizontal displacement plane; and means for setting said gear into vibration.

Thus, by virtue of the invention, the landing gear excitation obtained is akin to a real excitation produced during the normal conditions of use of an aircraft. The landing gear henceforth supports the weight of the aircraft, whereas, in the excitations known hitherto, the gear was suspended (the aircraft being lifted by rams) and therefore relieved of the weight of the aircraft. The wheels of the main landing gear rest on the ground during the excitation. Such a configuration, in addition to the fact that it is more representative of reality, makes it possible to test various strut lengths and to identify the trends in stability for a plurality of masses of the aircraft.

Furthermore, by virtue of the device of the invention, the rotational motions about the vertical axis of the landing gear during the excitation are transmitted directly to the upper part of the bracing foot, freely rotatable, in order to be studied. The foot support means also accurately follow the displacements of the gear in the horizontal plane, in the course of said excitation.

Moreover, the effective mass of the landing gear is only very slightly modified by the excitation device: the mass of the upper part of the foot of the device is negligible with respect to the mass of the gear.

Stated otherwise, the present invention makes it possible to obtain reliable results able to be used to study the dynamic behavior of the various elements of the aircraft and to optimize the design of the latter (reduction in the mass of certain equipment, parameterization of the devices aboard the aircraft, etc.).

Thus, the present invention makes it possible to test the structure of an aircraft:

in a safe manner in a hangar;
without aid of a crew aboard the aircraft;
without blocking any runway slots;
without consuming fuel;
rapidly owing to the fact that:
the lengths of the shock absorber of the gear, housed in its strut, can be very easily modified (for example by adjusting the pressure in the various corresponding chambers) to simulate various cases of the mass of the aircraft, whereas a real variation of its mass remains lengthy to implement; and
the rolling speeds are regulated instantaneously on account of the low resistance of the unloaded wheels;
in a methodical and exhaustive manner since the rolling speed and the unbalance of the wheels, optionally imposed, are known.

Preferably, said means for setting into vibration comprise means for driving said raised wheel in rotation about the axis of said axle. In this case, at least one wheel of the landing gear can be equipped with one or more disequilibrating flyweights to produce an unbalance on said wheel.

As a variant, said vibration means could take the form of one or more vibrating shakers in contact with the wheels of the landing gear.

Furthermore, said drive means can comprise at least one motor, transmission means and at least one roller in contact with said wheel. In the invention, these means cause the excitation through the setting into rotation of the wheels of the landing gear. Said means simulate the rolling of the aircraft on the runway.

The device can also comprise means for holding said wheel permanently in contact with said roller.

In particular, said holding means can comprise at least one ram, electric and/or hydraulic, able to thrust said roller against the wheel.

Furthermore, a spring mounted in series with said ram can advantageously absorb the oscillations of the wheel and thus avoid their transmission to said ram. The risk of mechanical breakage of the latter is thus reduced.

Thus, by accurately adjusting the extension of the ram, constant contact is ensured between the wheel and the roller. Incidentally, it is also possible to reproduce and materialize the forces applied to the wheel by the runway so as to render the excitation more faithful to reality.

As a variant, the holding means can comprise at least one rod of adjustable length connected to said roller, at one of its ends, and to said axle, at its other end. The length-adjustable rod makes it possible to adapt the excitation device of the invention to several different types of aircraft, so that the use of said device is not limited to a particular aircraft type.

Preferably, said movable support means and said means for setting into vibration are mounted on a platen able to be held stationary with respect to the ground.

Moreover, said movable support means can take the form of a movable platen, able to move freely along two orthogonal directions belonging to said displacement plane.

Moreover, said foot can comprise an internal vertical shock absorber, housed inside the latter, to materialize the stiffness of the tire of the wheel and, subsidiarily, to absorb the vertical motions of the landing gear in the course of said excitation. Furthermore, the shock absorber renders the strut of the landing gear freely translatable along the axis of the foot, thereby affording the strut an additional degree of freedom.

Preferably, said foot comprises a linkage means mounted at the free end of its upper part and intended to cooperate with an interface zone made at the lower end of said strut so as to form an auxiliary linkage, for example of ball joint type, permitting free rotation of said strut about two axes orthogonal to one another and to the axis of said foot.

In particular, said linkage means can take the form of a spherical shaped recess, intended to receive said interface zone of the strut, the zone being defined by a complementary spherical shaped protuberance.

Thus, thanks to the revolving linkage and ball joint linkage, to the shock absorber of the foot and to the mobility of the support means in the horizontal displacement plane, the landing gear is free to move in accordance with six degrees of freedom (corresponding to three translational displacements and to three rotational displacements).

Furthermore, said revolving linkage permitting free rotation of the upper part of said foot with respect to its lower part can comprise at least one ball bearing.

BRIEF DESCRIPTION OF THE DRAWINGS

The figures of the appended drawing will elucidate the manner in which the invention may be embodied. In these figures, identical references designate similar elements.

DETAILED DESCRIPTION OF THE PREFERRED EMBODIMENTS

Figure 1:
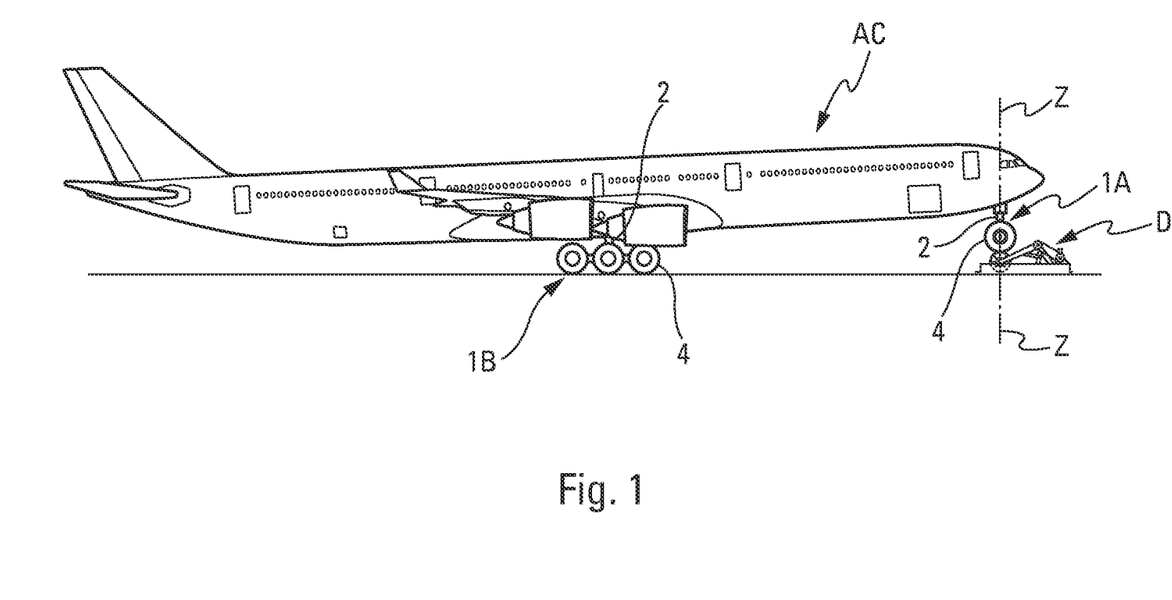
FIG. 1 represents, in a general schematic view, a civil airplane on the ground whose front gear is mounted on an excitation device according to an exemplary embodiment in accordance with the present invention.

In FIG. 1 has been represented, in a schematic manner, an airliner AC comprising a retractable steerable front landing gear 1A, in the extended position, excited by an excitation device D in accordance with the present invention. The airplane AC furthermore comprises two main landing gears 1B resting directly on the ground 6.

Figure 2:
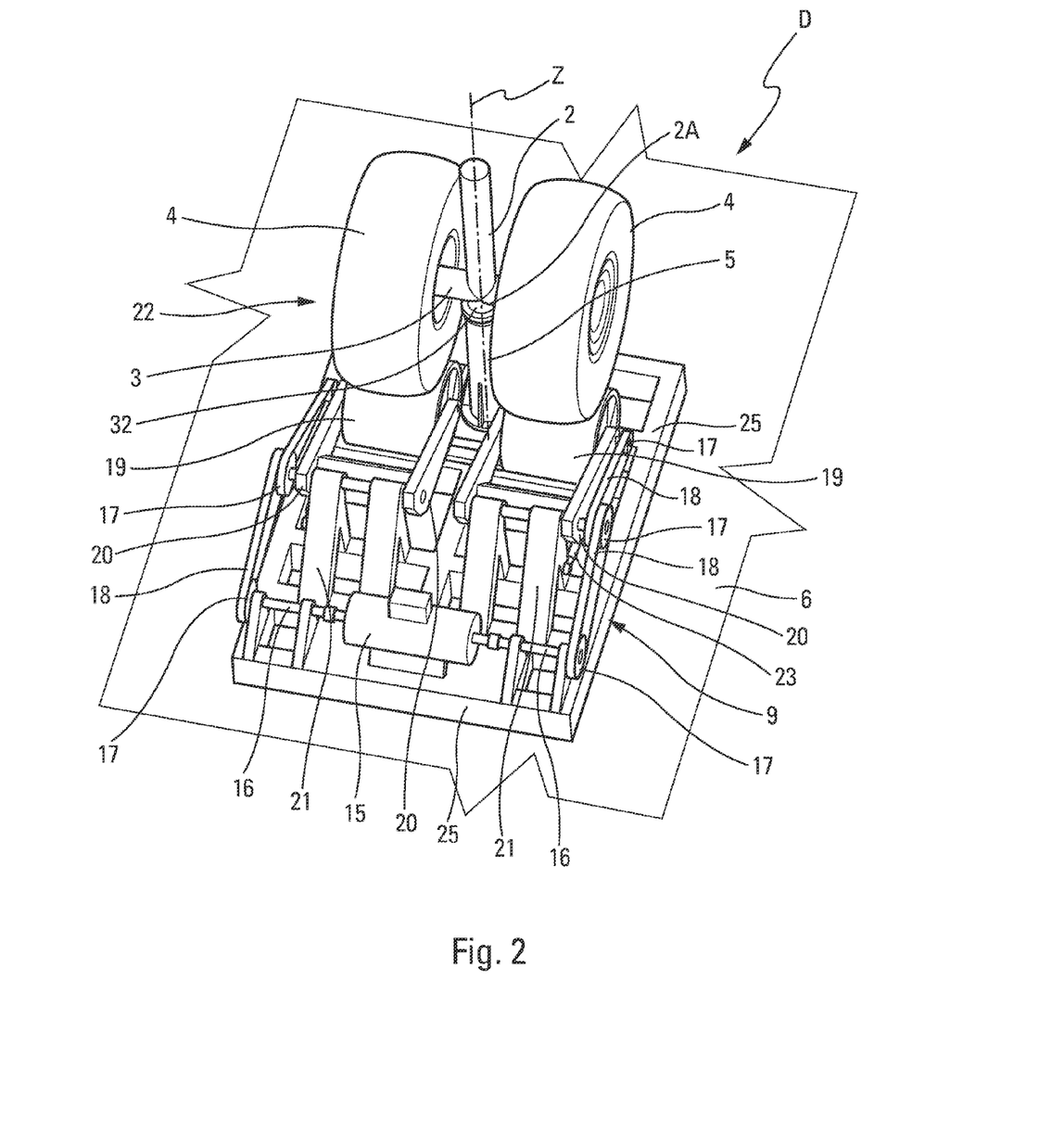
FIG. 2 is a schematic view in perspective of the topside of the excitation device of FIG. 1 in accordance with the present invention.

As shown by FIGS. 1 and 2, the front gear 1A comprises an elongate strut 2 mounted rotatably, with respect to the remainder of the airplane and of said gear 1A, about a vertical axis Z-Z. The rotation of the strut 2 about the vertical axis Z-Z is obtained by hydraulic actuation means (not represented).

The front gear 1A also comprises a double axle 3 orthogonal to the strut 2, fixed at the lower end 2A of the latter, as well as a pair of twin wheels 4 mounted free to rotate about said axle 3.

According to the invention, as is represented in FIGS. 2 to 5, the device D for the excitation on the ground of the front gear 1A of the airplane AC comprises:

an oblong bracing foot 5, of vertical axis Z-Z, making it possible to hold the two wheels 4 raised with respect to the ground 6. The foot 5 comprises a lower part 5A and an upper part 5B connected together by a revolving linkage 7 permitting free rotation, about the axis Z-Z of the foot 5, of the upper part 5B with respect to the lower part 5A. The upper part 5B is able to be applied to the lower end 2A of the strut 2;

support means 8 on which said oblong foot 5 is mounted. These means 8 are movable in a horizontal displacement plane defined by two orthogonal axes X-X and Y-Y, the vertical axis Z-Z being orthogonal to the displacement plane; and means 9 for driving the raised wheels 4 in rotation about the axis of the axle 3.

Thus, to fit the excitation device D on the ground 6, the nose of the airplane AC is lifted, with the aid of a hydraulic ram, so as to correctly position the device D with respect to the strut 2 and to the wheels 4 of the extended front gear 1A. Provided that such a positioning has been carried out correctly, the airplane AC is progressively lowered in such a way that the strut 2 rests on the upper part 5B of the oblong foot 5.

In this case, the front gear 1A supports at least a part of the load of the airplane AC, in a manner which is akin to the real conditions of load of the front gear 1A when the wheels of the latter rest on the ground.

To excite the front gear 1A and set it vibrating, the device D sets the wheels 4 into rotation at a predetermined rotation speed (for example between 0 Hz and 30 Hz). The wheels 4 can also be equipped with disequilibrating flyweights.

Thus, the excitation of the front gear 1A, obtained through the rotation of the wheels 4, is like that produced during the normal conditions of use of the front gear 1A. The dynamic behavior of the latter, determined by virtue of the excitation caused by the device D of the invention, is reliable and faithful to reality.

Figure 5:
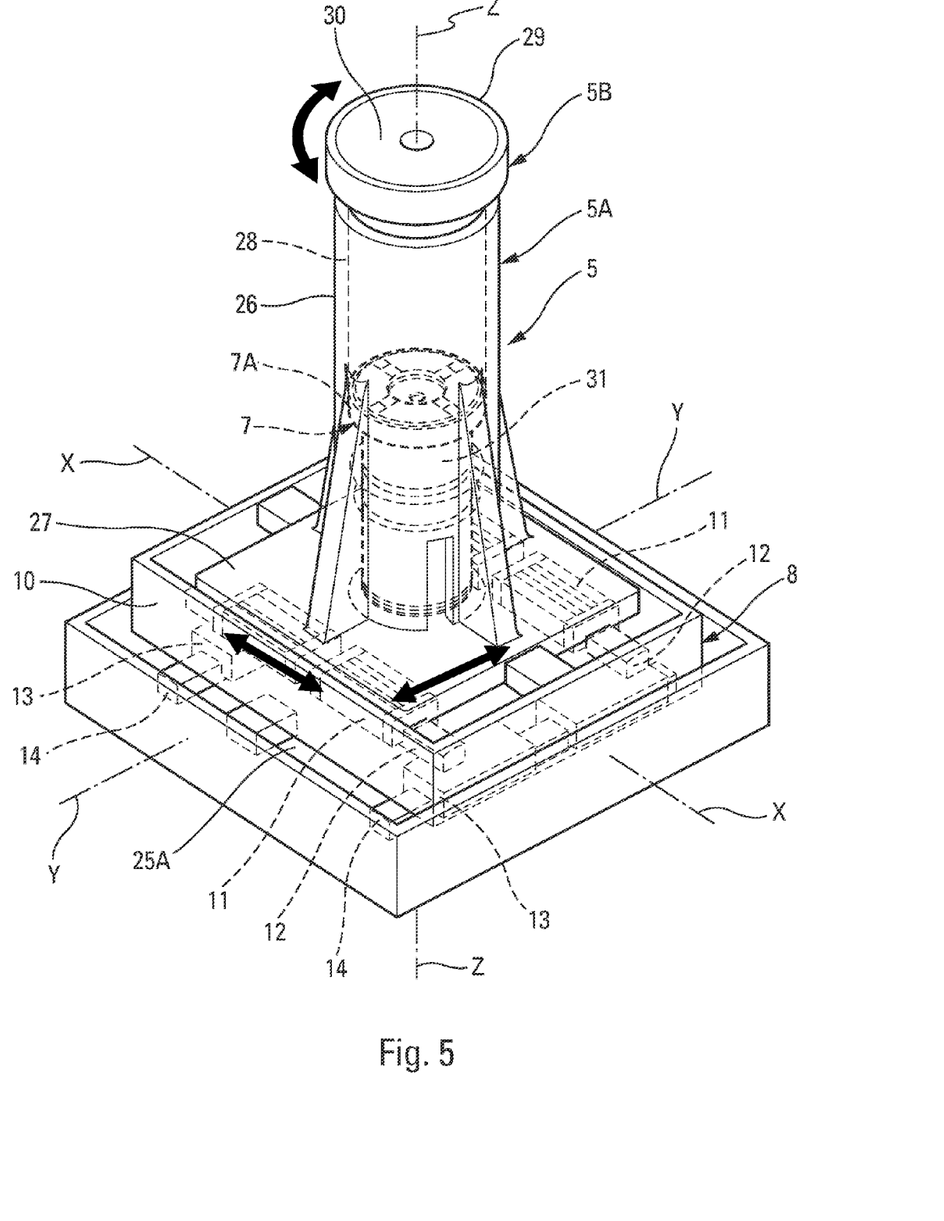
FIG. 5 is a magnified view of the bracing foot and of the X-Y movable platen, on which it is mounted, belonging to the excitation device of FIG. 1.

In the example described, as shown by FIG. 5, the support means 8 take the form of a movable platen 10, able to move freely along the two orthogonal axes X-X and Y-Y.

The platen 10 is mounted on first skids 11 sliding on first guidance rails 12, parallel to one another and to the axis X-X. The first guidance rails 12 are for their part carried by second sliding skids 13 mounted on second rails 14, parallel to one another and to the axis Y-Y. Stated otherwise, the first and second guidance rails 12 and 14 are mutually orthogonal.

Thus, the movable platen 10 can move freely along the two directions X-X and Y-Y.

Moreover, as shown by the figures, the means 9 for driving wheels 4 is a rotational device in contact with the wheel which may comprise an electric motor 15, a transmission shaft 16, pulleys 17 connected together by drive belts 18, as well as two rollers 19 in contact with the corresponding wheels 4.

The motor 15 sets the transmission shaft 16 into rotation, at a determined rotation speed. The shaft 16 transmits the rotational motion to the pulleys 17, fixed at each of the longitudinal ends thereof, which in their turn drive intermediate pulleys 17, by means of drive belts 18. These intermediate pulleys 17 transmit, through other belts 18, the rotational motion to terminal pulleys 17 secured to the longitudinal axis of the rollers 19, which then rotate.

The rollers 19 are supported by bearings 20 which are mounted movably, at their free end, to an armature 21. Thus, the angular position of each of the bearings 20, with respect to the corresponding armature 21, is variable and accurately adjustable, so as to hold the wheels 4 permanently in contact with the corresponding rollers 19 and optionally to allow the successive adaptation of the device D to various types of airplane.

The rotation speed of the rollers 19, which is transmitted to the wheels 4, is, for example, regulated accurately by a regulating means (not represented in the figures) controlled automatically or manually by an operator as a function of the response of the structure of the airplane AC.

The device D furthermore comprises a holder 22 arranged to hold the wheels 4 permanently in contact with the corresponding rollers 19.

In the example, the holder 22 may comprise two rams 23 for thrusting the rollers 19 against the corresponding wheels 4 (for example with a constant loading of about 50 kg), in such a way that the rotation axes of the rollers 19 and of the associated wheels 4 belong to one and the same vertical plane. Stated otherwise, in the holding configuration, the rollers 19 are arranged under the corresponding wheels 4, in line with the latter, thereby making it possible to avoid a modification of the fore-aft rigidity of the landing gear 1A. The rams 23 also make it possible to disengage the rollers 19 from the corresponding wheels 4 to allow free deceleration of the latter.

Furthermore, a spring (not represented) can advantageously be mounted in series with each ram 23, so as to absorb the oscillations of the associated wheel 4 and avoid their transmission to said ram 23.

Thus, by accurately adjusting the extension of the rams 23, the wheels 4 can be compressed to a greater or lesser degree on the corresponding rollers 19, so as to ensure permanent contact, whatever the pressure of the tires of the wheels 4.

Subsidiarily, it is also possible to reproduce and materialize the forces applied to each of the wheels 4 by the runway so as to render the excitation more faithful to reality.

Figure 3:
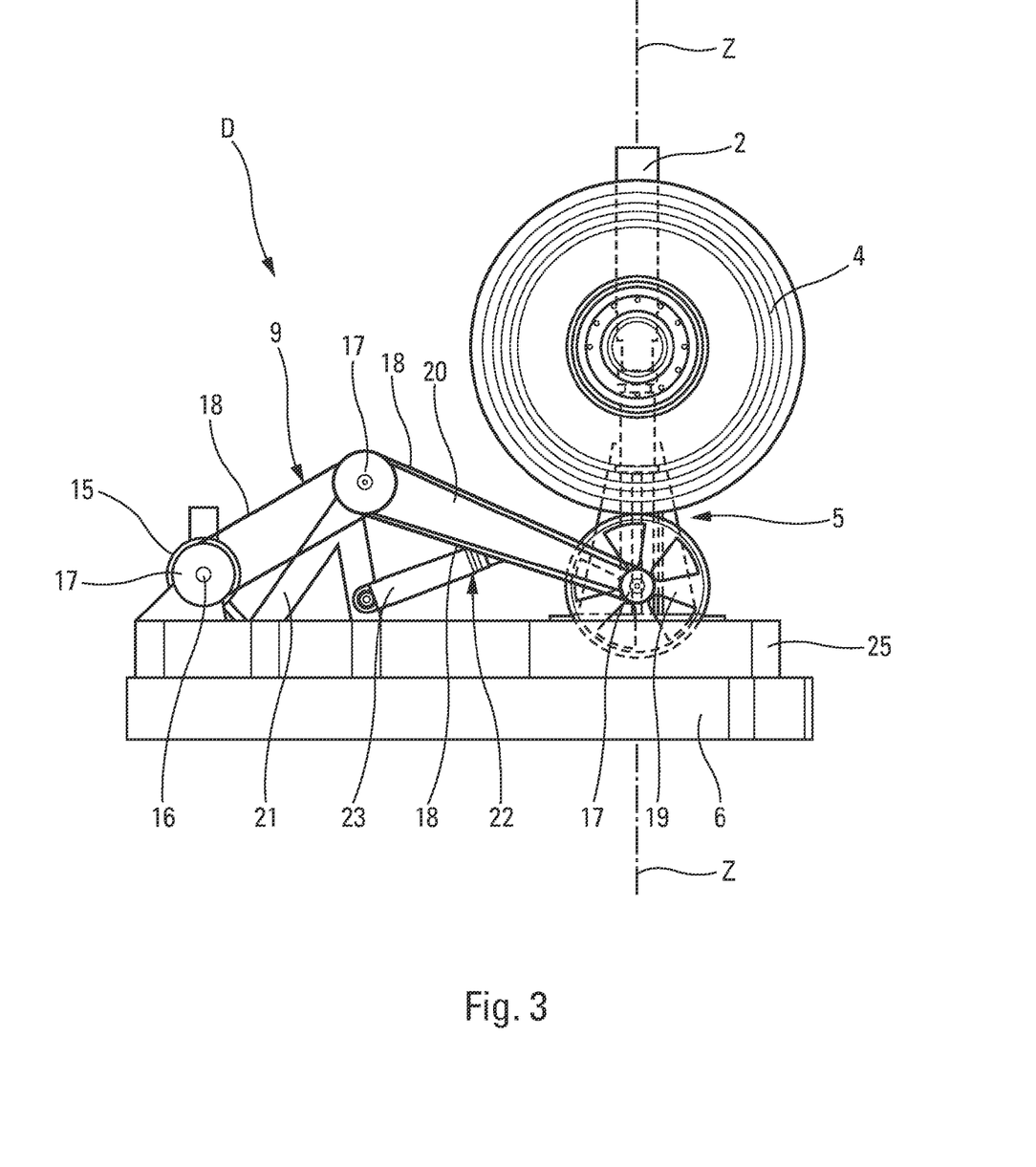
FIGS. 3 and 4 show, in a schematic view respectively from the side and from the rear, the excitation device of FIG. 1.
Figure 3A:
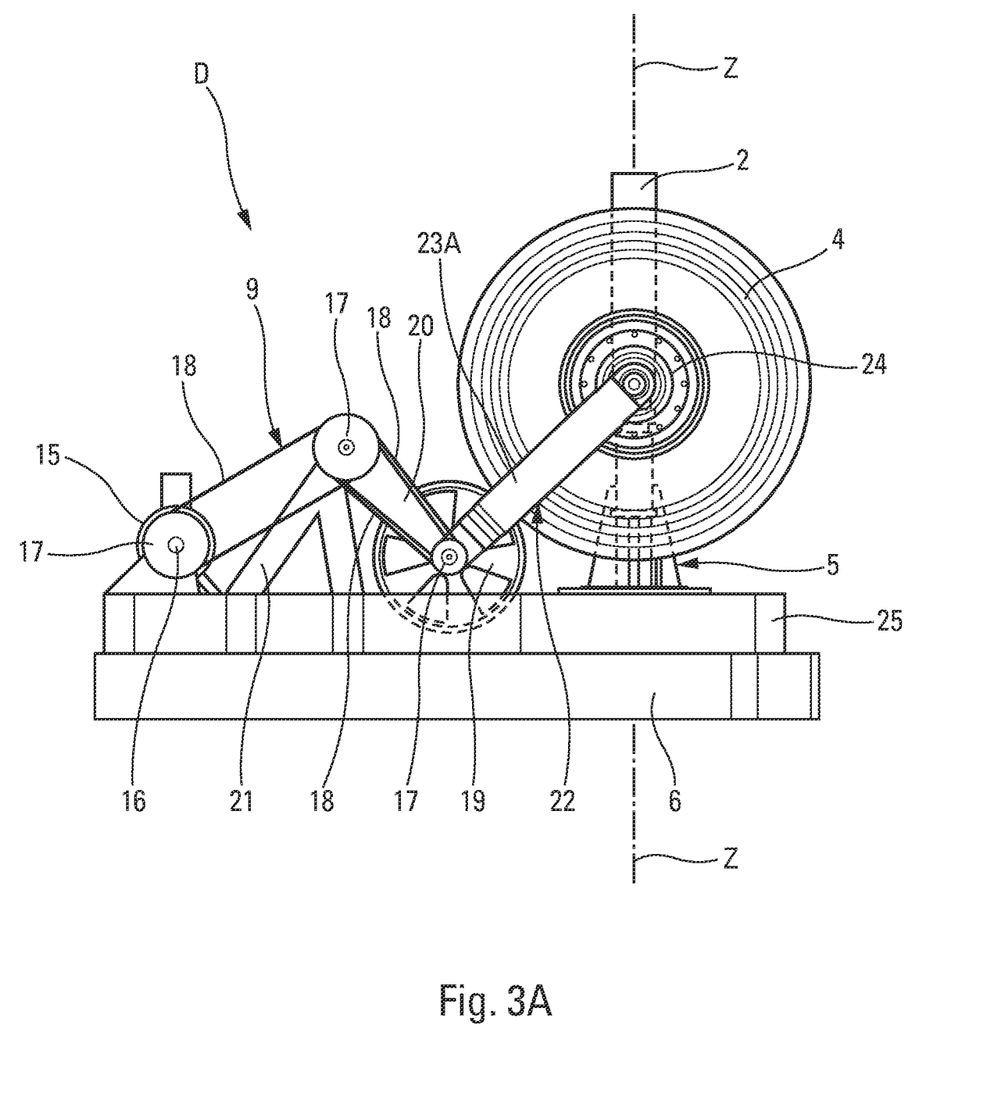
FIG. 3A, similar to FIG. 3, represents a variant embodiment of the means for holding the rollers of the excitation device of FIG. 1.
Figure 4:
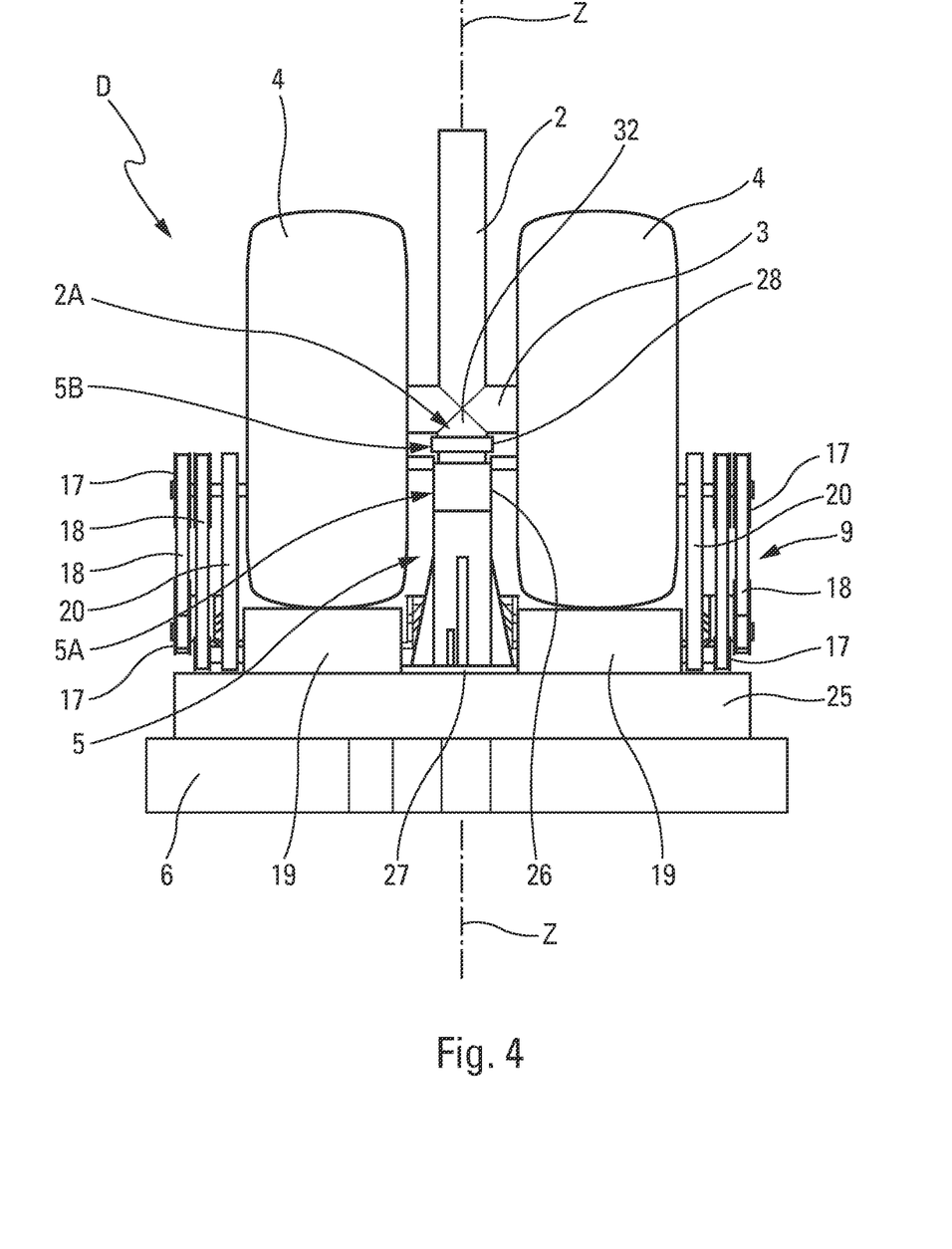

In an advantageous variant illustrated in FIG. 3A, the holder 22 may comprise two rods 23A of adjustable length. Each rod 23A is connected, at one of its ends, to the axis of a corresponding roller 19 and, at its other end, to the axis of said axle 3 by way of a suitable adaptor 24.

In a similar manner to the rams 23, by accurately adjusting the length of the rods 23A, the wheels 4 can be compressed to a greater or lesser degree on the corresponding rollers 19.

It will be understood that the information pertaining to the speeds of the rollers 19 and wheels 4 and to the loadings applied to the latter can be measured accurately and transmitted to acquisition means (not represented) associated with the device D, which record the response of the airplane AC.

Moreover, the movable support means 8 and the drive means are mounted on a fixed platen 25.

As shown by FIG. 5, the second guidance rails 14 of the movable platen 10 rest on an adjustable attitude base 25A, which is supported by the platen 25 able to be held stationary with respect to the ground 6.

It will be noted that:

retractable ball transfer units (not represented) can be mounted on the platen 25 to allow its displacement; and adjusting feet (not represented) can be integrated into the platen 25 to allow its immobilization on the ground and adjustment of its inclination with respect to a horizontal plane.

Furthermore, the lower part 5A of the foot 5 takes the form of a tube 26, in a vertical position during the excitation, and of a flat base 27 mounted securely at the lower end of the tube 26. The flat base 27 of the foot 5 is supported by the movable platen 10 and keyed onto the latter, so that the movable platen 10 accurately follows the displacements of the front gear 1A in the horizontal plane by way of the foot 5, in the course of an excitation.

The upper part 5B is formed of a tubular shaped adaptor 28 whose cross section is such that it can be introduced, with adjustment, into the tube 26.

Figure 6:
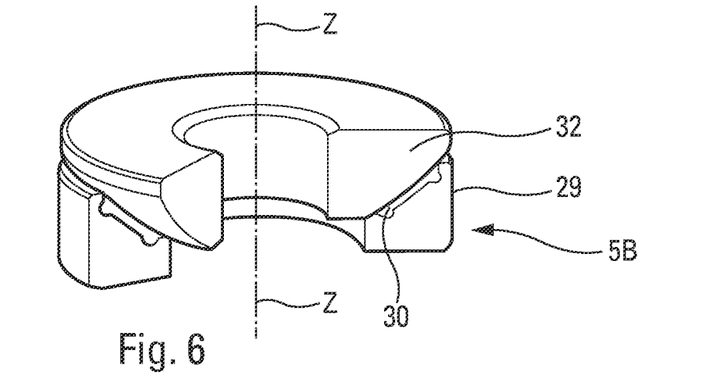
FIG. 6 is a magnified and partially cut-away perspective of the ball joint articulation of the foot of the excitation device of FIG. 1.

Such as illustrated in FIGS. 5 and 6, the adaptor 28 comprises, at its upper end, a race 29 comprising a spherical shaped recess 30 in which can be housed a complementary spherical shaped protuberance 32 (also called a dome) arranged at the lower end 2A of the strut 2 so as to form a ball joint articulation R between the foot 5 and the strut 2.

It will be noted that the protuberance 32—customarily used when changing the wheels—is normally identical for all types of airplane. This renders the device D of the invention compatible with all types of airplane. In case of incompatibility, provision may nonetheless be made to render the adaptor 28 removable or else to insert an appropriate interface component between the race 29 and the protuberance 32.

Thus, by virtue of the ball joint articulation R, the rotation of the strut 2 about two axes orthogonal to one another and to the axis Z-Z of the foot 5 is free, thereby conferring two additional degrees of freedom on the landing gear 1A suspended on the foot 5.

Furthermore, the foot 5 comprises an internal vertical shock absorber 31 housed inside the tube 26. This shock absorber 31, for example formed of a vertical stack of Belleville washers or else of air bags, materializes the stiffness of the tires of the wheels 4, so as to obtain more realistic dynamic behavior of the front gear 1A.

The revolving linkage 7, permitting free rotation of the upper part 5B of the foot 5 with respect to its lower part 5A, can comprise at least one ball bearing 7A. It is inserted between the internal shock absorber 31 and the lower end of the adaptor 28.

Thus, by virtue of the revolving linkage 7, the ball joint articulation R, the shock absorber 31 and the movable platen 10, the suspended landing gear 1A exhibits six degrees of freedom.

Figure 7:
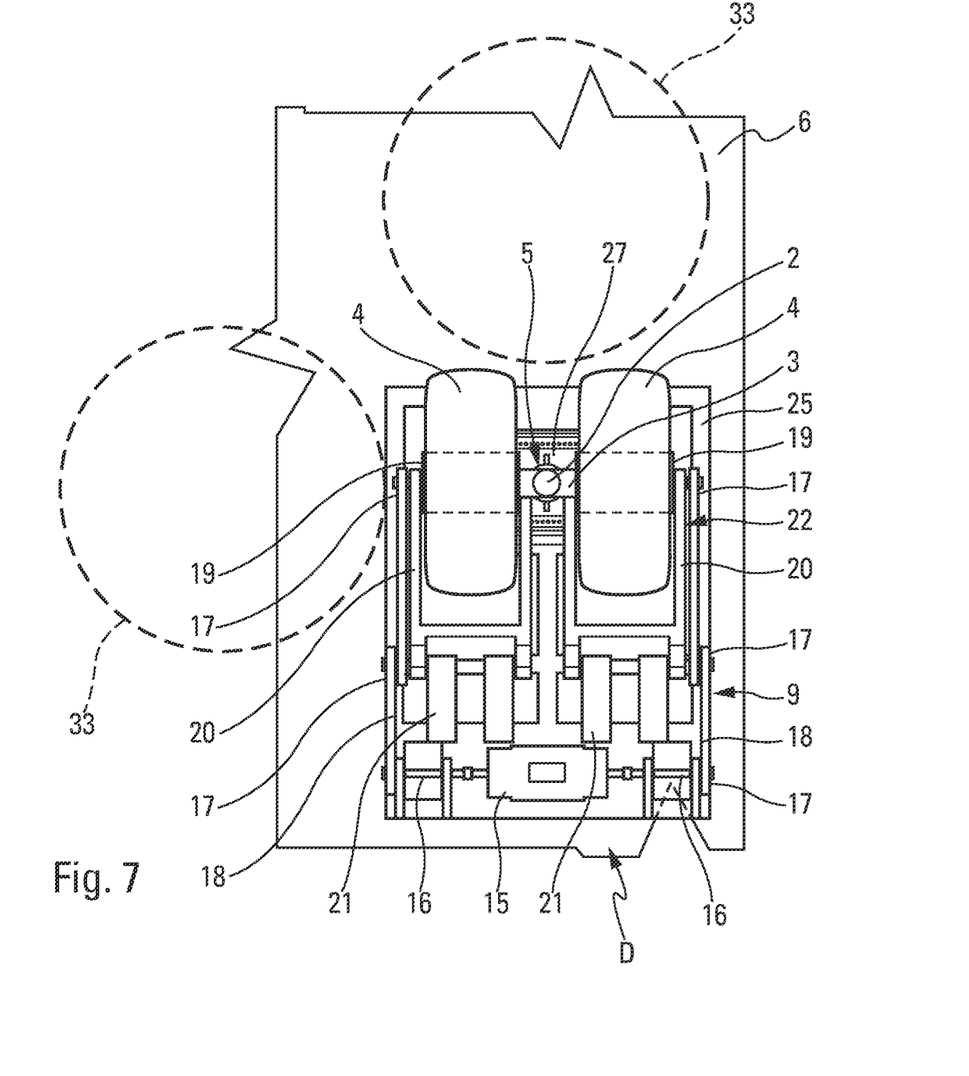
FIG. 7 is a schematic view of the topside of the device of FIG. 1, on which are represented the sites of rams used to raise the nose of two distinct types of airplane.

Moreover, as shown by FIG. 7, the reduced bulk of the excitation device D of the invention allows it not to impede the positioning of the hydraulic lifting ram for raising the airplane.

In this figure, the site of a hydraulic ram for a particular airplane type is symbolized by a dashed circle 33.

Moreover, the device D comprises a plurality of sensors (not represented) for detecting the displacements of the movable platen 10, any rotation of the upper part 5B of the foot 5 about the vertical axis Z-Z, any vertical translation of the gear 1A, as well as any rotation of the ball joint articulation R.

Furthermore, the airplane is also equipped with sensors, such as accelerometers and strain gauges, for recording the vibratory behavior of the various elements thereof, and especially of the front gear 1A.

All of these sensors are for example connected to the aforementioned acquisition means.

Thus, by varying certain parameters of the device D and/or of the airplane AC, it is possible to obtain various dynamic behaviors of the front gear 1A subjected to a determined excitation.

In particular, it is possible to vary the rotation speed of the wheels, to equip one of the two wheels (or indeed both) with disequilibrating flyweights, to modify the load of the airplane AC, to adjust the length of the shock absorber of the front gear (thereby modifying the stiffness thereof and simulating a variation in the mass of the airplane AC), etc.

By virtue of the device D of the invention, whatever the excitation carried out, the latter is accurately calibrated.

It will be noted that, in a variant, the drive means 9 for the wheels 4 can be mounted removably, thereby making it possible to detach them from the remainder of the device D (and especially the bracing foot 5). In this way, it is possible to install the drive means 9 once the landing gear has been suspended by the foot 5. Furthermore, a hoisting means could be mounted directly on the device D so as to raise the nose of the airplane AC in an autonomous manner, after positioning under the landing gear.

Moreover, the invention also relates to a system for the complete suspension of the airplane AC above the ground 6.

Such a system (not represented in the figures) comprises as many devices D, in accordance with the invention, as the airplane AC comprises landing gears 1A and 1B.

The devices D may optionally be equipped with the means 9 for driving the wheels 4 of the gears. For example, just the device D on which the front gear 1A rests could comprise means for driving the wheels.

Once the airplane AC has been suspended by means of the devices D, each landing gear 1A, 1B exhibits six degrees of freedom, thereby making it possible to study the dynamic behavior of the airplane under conditions of quasi-total freedom.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A device for excitation on ground of a landing gear of an aircraft, said gear comprising a strut disposed vertically during said excitation, an axle disposed orthogonally with respect to said strut and at least one wheel mounted freely rotatable about said axle, said device comprising:
   an oblong bracing foot, having a vertical axis, able to hold said at least one wheel raised with respect to the ground, said oblong bracing foot comprising a lower part and an upper part connected together by a revolving linkage permitting free rotation, about the verticle axis of said oblong bracing foot, of the upper part of said oblong bracing foot with respect to the lower part, said upper part being able to be applied to a lower end of said strut;
   a support on which said oblong bracing foot is mounted; and
   an arrangement operative to set said gear into vibration, wherein said support is movable in a horizontal displacement plane, and said arrangement comprises a rotational device in contact with said raised at least one wheel and arranged to drive said raised at least one wheel in rotation about an axis of said axle.

2. The device as claimed in claim 1, wherein said rotational device comprises at least one motor, transmission means and at least one roller in contact with said at least one wheel.

3. The device as claimed in claim 2, further comprising an adjustable device positioned to hold said at least one wheel permanently in contact with said at least one roller.

4. The device as claimed in claim 3, wherein the adjustable device comprises at least one ram able to thrust said at least one roller against said at least one wheel.

5. The device as claimed in claim 3, wherein said adjustable device comprises at least one rod of adjustable length connected to said at least one roller, at one of its ends, and to said axle, at its other end.

6. The device as claimed in claim 1, wherein said movable support and said arrangement are mounted on a platen able to be held stationary with respect to the ground.

7. The device as claimed in claim 1, wherein said movable support takes the form of a movable platen, able to move freely along two orthogonal directions belonging to said displacement plane.

8. The device as claimed in claim 1, wherein said oblong bracing foot comprises an internal vertical shock absorber, housed inside said oblong bracing foot.

9. The device as claimed in claim 1, wherein said oblong bracing foot comprises a linkage mounted at a free end of said upper part and intended to cooperate with an interface zone made at said lower end of said strut so as to form an auxiliary linkage permitting free rotation of said strut about two axes orthogonal to one another and to the verticle axis of said oblong bracing foot.

10. The device as claimed in claim 9, wherein said auxiliary linkage comprises a ball joint.

11. The device as claimed in claim 9, wherein said linkage takes the form of a spherical shaped recess, intended to receive said interface zone of the strut and defined by a complementary spherical shaped protuberance.

* * * * *